US012618500B2

(12) United States Patent　　　(10) Patent No.:　　US 12,618,500 B2

Boulard　　　　　　　　　　　　　(45) Date of Patent:　　　　May 5, 2026

(54) HYDRAULIC COUPLING

(71) Applicant: AGCO International GmbH, Neuhausen (CH)

(72) Inventor: Nicolas Boulard, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/593,224

(22) Filed: Mar. 1, 2024

(65) Prior Publication Data

US 2024/0318755 A1　　Sep. 26, 2024

(30) Foreign Application Priority Data

Mar. 24, 2023　(GB) ...................................... 2304339

(51) Int. Cl.
*F16L 37/00*　　　(2006.01)
*F16L 37/08*　　　(2006.01)

(52) U.S. Cl.
CPC ............. *F16L 37/004* (2013.01); *F16L 37/08* (2013.01)

(58) Field of Classification Search
CPC .......... F16L 37/004; F16L 37/56; F16L 37/08
USPC ......................................................... 285/9.1
See application file for complete search history.

(56) References Cited

U.S. PATENT DOCUMENTS 2,965,136 A * 12/1960 Burris ................ G03G 15/0803
　　　　　　　　　　　　　　　　　　　285/9.1
3,079,178 A * 2/1963 Simpkins .............. F16L 37/252
　　　　　　　　　　　　　　　　　　　285/91

3,160,386 A * 12/1964 Heine ........................ H01J 9/34
　　　　　　　　　　　　　　　　　　　285/9.1
4,004,298 A * 1/1977 Freed ................ A61M 39/0247
　　　　　　　　　　　　　　　　　　　285/9.1
7,793,987 B1 * 9/2010 Busch ................. A61M 16/161
　　　　　　　　　　　　　　　　　　　285/9.1

(Continued)

FOREIGN PATENT DOCUMENTS

CN　　　111536346 A　　8/2020
CN　　　113339607 A　　9/2021
(Continued)

OTHER PUBLICATIONS

European Patent Office, Search Report related to EP24161051.8, mail date Aug. 5, 2024, 8 pages.

(Continued)

*Primary Examiner* — David Bochna

(57)　　　　　　　ABSTRACT

A hydraulic coupling arrangement includes a push-fit, quick-connect hydraulic coupling comprising a male connector and a female connector. The male and female connectors each define a longitudinal axis, with the male connector being insertable into the female connector in an axial direction parallel to the longitudinal axes of the connectors. An electromagnetic coil is located external to but associated with one connector. A support member carries the other connector and includes a magnetically attractive material for interaction with the coil. The arrangement is configured such that with male connector positioned for insertion into the female connector, activation of the coil draws the magnetically attractive material, the support member and the other connector in the axial direction to assist in inserting the male connector into the female connector.

15 Claims, 4 Drawing Sheets

(56)     References Cited

U.S. PATENT DOCUMENTS

| | | | | |
|---|---|---|---|---|
| 8,136,844 B1 * | 3/2012 | Liu | .......................... | F16L 37/56 |
| | | | | 285/9.1 |
| 2006/0049629 A1 * | 3/2006 | Naumann | ............. | F16L 37/004 |
| | | | | 285/308 |
| 2012/0013117 A1 * | 1/2012 | Bernshtein | .............. | F16L 37/42 |
| | | | | 285/9.1 |
| 2016/0229680 A1 * | 8/2016 | Cornett | ............... | F16L 55/1015 |
| 2021/0378469 A1 | 12/2021 | Valentini | | |
| 2022/0000693 A1 | 1/2022 | Wei | | |

FOREIGN PATENT DOCUMENTS

| | | |
|---|---|---|
| EP | 1088191 B1 | 4/2006 |
| EP | 2084447 B1 | 6/2022 |
| SU | 626301 A1 | 9/1978 |

OTHER PUBLICATIONS

UK Intellectual Property Office, Search report for related UK Application No. GB2304339.1, dated Sep. 15, 2023, 3 pages.

* cited by examiner

HYDRAULIC COUPLING

CROSS-REFERENCE TO RELATED APPLICATION

This application claims the benefit of the filing date of U. K. Patent Application 2304339.1, "Hydraulic Couplings," filed Mar. 23, 2023, the entire disclosure of which is incorporated herein by reference.

FIELD

Embodiments of the present disclosure relate generally to push-fit, quick-connect hydraulic couplings having a male connector for insertion into a female connector and which are suitable for use on utility vehicles having a hydraulic supply system, such as tractors and construction vehicles.

BACKGROUND

Many utility vehicles have a hydraulic supply system which is used to supply hydraulic fluid under pressure to hydraulic consumers on the vehicle. It is also known to use the hydraulic supply system on a utility vehicle to provide hydraulic fluid to consumers on an implement which is temporarily attached to the vehicle. Such implements may be towed by the vehicle or mounted to a hitch on the vehicle, for example. In order to temporarily connect the hydraulic supply system on the vehicle with a hydraulic circuit on the implement, it is known to use push-fit, quick-connect hydraulic couplings having a male connector which is inserted into a female connector. Usually, the female connector of each coupling is provided on the vehicle and the male coupling is attached to an end of a hydraulic pipe on the implement. In some known arrangements, female connecters are integrated into a valve block on the vehicle having a number of hydraulic valves located side-by-side for controlling hydraulic consumers on an attached implement. Two couplings are typically provided for each valve, one coupling forming part of a supply line through which hydraulic fluid is provided from the vehicle to the implement and the other forming part of a return line through which hydraulic fluid is returned from the implement to the vehicle when the valve is open.

Push-fit, quick-connect couplings have a mechanical locking arrangement which is engaged once the male connector has been inserted into the female connector to hold the male connector in engagement in the female connector. The mechanical locking arrangement typically has a biasing arrangement which must be overcome to insert the male connector sufficiently to engage the locking arrangement. The force required to insert the male connector into the female connector can be uncomfortably high, thus rendering connection of the coupling problematic. This is a particular issue where a user is required to engage a number of couplings in order to hydraulically connect an implement to the hydraulic supply system on a vehicle.

BRIEF SUMMARY

In some embodiments, a hydraulic coupling arrangement includes at least one push-fit, quick-connect hydraulic coupling comprising a male connector and a female connector each defining a longitudinal axis, and an electromagnetic actuator located externally of the connectors. The male connector is configured for insertion into the female connector in an axial direction parallel to the longitudinal axes of the connectors. The electromagnetic actuator is operative to draw the male connector into the female connector when the connectors are positioned for insertion of the male connector into the female connector.

The electromagnetic actuator may comprise an electromagnetic coil external to and associated with one connector and a support member carrying the other connector, the support member comprising a magnetically attractive material for interaction with the coil, wherein the electromagnetic coil is operative to draw the magnetically attractive material, the support member, and the other connector in the axial direction to assist in the insertion of the male connector into the female connector.

In another embodiment, a hydraulic coupling arrangement includes at least one push-fit, quick-connect hydraulic coupling comprising a male connector and a female connector each defining a longitudinal axis, an electromagnetic coil external to and associated with one connector, and a support member carrying the other connector. The male connector is configured for insertion into the female connector in an axial direction parallel to the longitudinal axes of the connectors. The support member includes a magnetically attractive material for interaction with the coil. The electromagnetic coil is operative to draw the magnetically attractive material, the support member, and the other connector in the axial direction to assist in the insertion of the male connector into the female connector.

The magnetically attractive material may be a metallic material and may be a ferromagnetic metallic material.

The electromagnetic coil is typically located in a fixed position relative to the one connector and in use is actuated with the male and female connectors aligned for insertion. Once actuated, the electromagnetic coil attracts the magnetically attractive material and helps to draw the male connector into the female connector. This overcomes at least some of the bias force of the locking arrangement so that the user does not have to apply as much force as with a conventional, unassisted coupling. Once the locking arrangement is engaged, the electromagnetic coil can be deactivated, relying on the mechanical locking arrangement to keep the male connector engaged in the female connector in the usual way. Thus, electrical power need be provided to the electromagnetic coil only during the engagement process. The electromagnetic coil and support member with the magnetically attractive material are external to the connectors and so the connectors do not require any internal modification. This enables use of otherwise standard push-fit, quick action coupling connectors.

The magnetically attractive material may comprise a projection shaped for insertion into the electromagnetic coil, the projection having a longitudinal axis aligned parallel to the longitudinal axis of the other connector. The arrangement may be configured such that the projection is aligned for insertion in the electromagnetic coil when the connectors are aligned for insertion of the male connector into the female connector.

The support member may carry the male connector, the longitudinal axis of the projection being aligned parallel to and offset from the longitudinal axis of the male connector.

In an embodiment, the coupling arrangement further comprising at least two push-fit, quick-connect couplings, wherein the support member carries the other connector of each of the couplings, wherein the electromagnetic coil is operative to draw the magnetically attractive material, the support member, and the other connectors in the axial direction to assist in insertion of the male connectors into the female connectors.

In an embodiment, the coupling arrangement comprises two push-fit, quick-connect couplings, the electromagnetic coil is located adjacent, and optionally between, the female connectors of the couplings and the male connectors are carried by the support member, the magnetically attractive material comprises a metallic projection aligned with its longitudinal axis parallel to the longitudinal axes of the male connectors. The arrangement is configured such that with the male connectors each aligned for insertion in their respective female connector, the projection is aligned for insertion in the electromagnetic coil such that activation of the electromagnetic coil is operative to draw the projection into the coil and to draw the male connectors into their respective female connectors.

The hydraulic coupling arrangement may have an actuator system for activating the electromagnetic coil, in which the actuator system comprises an electrical circuit including a manually operable switch for activating the coil.

The support member may be coated with the magnetically attractive material.

The support member may be made of the magnetically attractive material.

The hydraulic coupling arrangement may be configured for use with a utility vehicle, the, or each, one connector and the electromagnetic coil being mounted to the utility vehicle. The support member may be provided as part of an implement attachable to the utility vehicle. Where the hydraulic coupling arrangement has an actuator system for activating the electromagnetic coil, in which the actuator system comprises an electrical circuit including a manually operable switch for activating the coil, the electrical circuit may operate using an algorithm which ensures that the electromagnetic coil can only be activated when at least one condition is met. The at least one condition may be indicative that the utility vehicle is in a park mode. The actuator system may include an electronic controller, which may be a programmable controller, configured to operate according to the algorithm.

Certain embodiments include a combination of a utility vehicle and an implement attached to the utility vehicle, the combination comprising a hydraulic coupling arrangement as disclosed. One connector may form part of a hydraulic supply system of the utility vehicle and the other connector may form part of a hydraulic circuit on the implement. The utility vehicle may be a tractor. The implement may be an agricultural implement. The coupling arrangement may comprise two push-fit quick-connect hydraulic couplings, one coupling forming part of a supply line for supplying hydraulic fluid from the utility vehicle to a hydraulic consumer on the implement, the other coupling forming part of a return line for returning hydraulic fluid from the consumer on the implement to the utility vehicle.

A method of using the coupling arrangements described includes, with the connectors positioned for insertion of the male connector into the female connector, activating the electromagnetic coil to draw the draw the magnetically attractive component, the support member and the other connector in the axial direction to assist in the insertion of the male connector into the female connector and subsequently deactivating the coil once the male connector is inserted into and coupled with the female connector.

The various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the accompanying drawings, in which.

DETAILED DESCRIPTION

Figure 1:
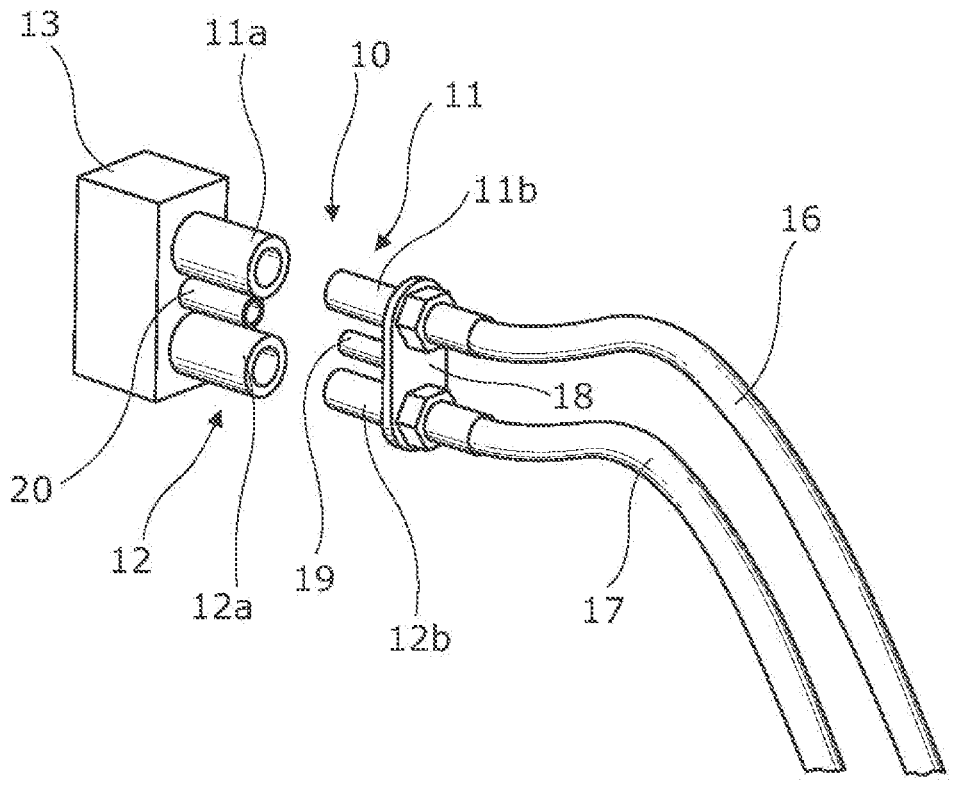
FIG. 1 shows a schematic perspective view of a hydraulic coupling arrangement as applied to a single hydraulic valve in a disconnected state.
Figure 2:
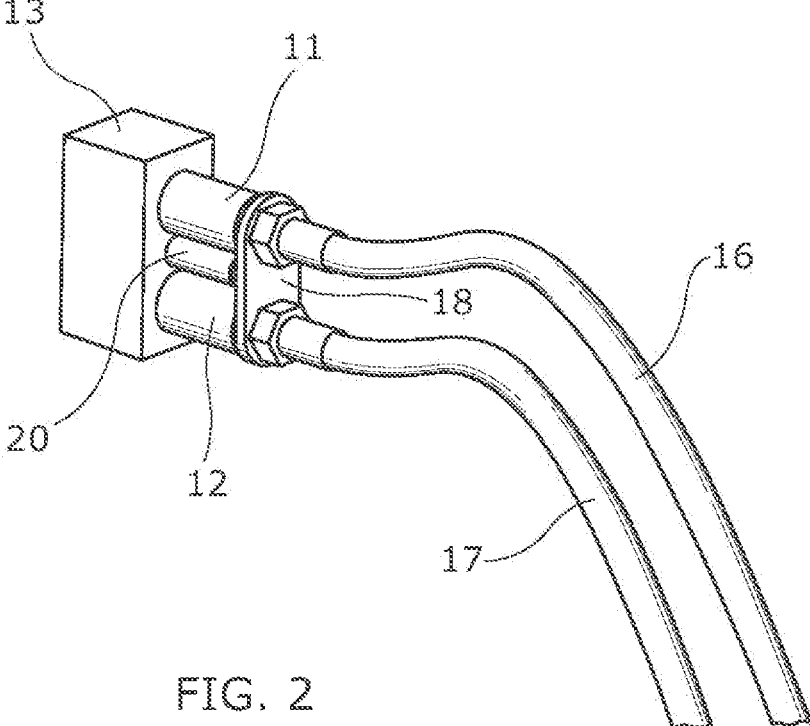
FIG. 2 shows the hydraulic coupling arrangement of FIG. 1 in a connected state.
Figure 5:
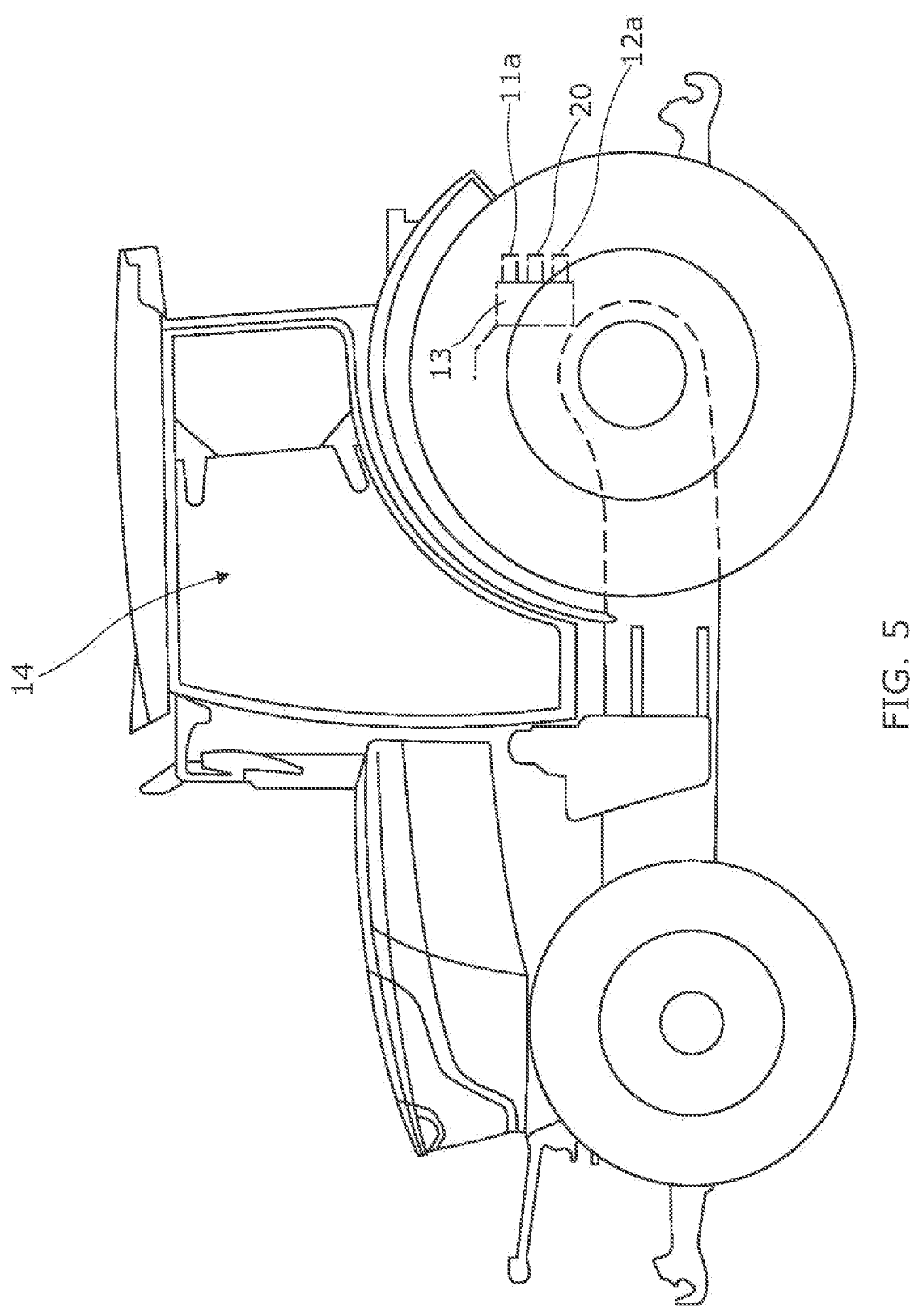
FIG. 5 shows a side view of a tractor with part of the hydraulic coupling arrangement of FIG. 1 fitted to a rear housing.

FIGS. 1 and 2 show diagrammatic representations of a hydraulic coupling arrangement 10 in which two push-fit, quick-connect hydraulic couplings 11, 12 are associated with a hydraulic valve 13. The valve 13 in this embodiment may be located towards the rear of a tractor 14 (see FIG. 5) or similar utility vehicle. The couplings 11, 12 can be used to connect a hydraulic supply system on the vehicle with a hydraulic circuit on an implement which is attached to the tractor 14 so that a hydraulic consumer on the implement can be supplied with hydraulic fluid under pressure from the supply system on the vehicle when the valve 13 is opened.

One of the couplings 11 forms part of a supply line through which hydraulic fluid is supplied to the hydraulic consumer and includes a female supply connector 11a and a male supply connector 11b. The other hydraulic coupling 12 forms part of a return line through which fluid is returned from the hydraulic consumer to the vehicle and includes a female return connector 12a and a male return connector 12b. The female connectors 11a, 12a form part of the hydraulic supply system on the vehicle and are fluidly connected respectively with a pump or other source of pressurized hydraulic fluid and a fluid tank or reservoir on the vehicle through the valve 13. The male supply and return connectors 11b, 12b form part of a hydraulic circuit on the implement and are connected with the hydraulic consumer via respective fluid pipes 16, 17.

In FIG. 1 the couplings 11, 12 are shown disconnected and in FIG. 2 connected.

As is well known in the art, the push-fit, quick-action couplings 11, 12 each have a mechanical locking arrangement which is engaged once the male connector 11b, 12b has been correctly inserted into the female connector 11a, 12a to hold the male connector in engagement in the female connector. Such push-fit, quick coupling or fast couplers may be constructed in accordance with standards ISO 7241, ISO 5675, or ISO 16028, for example.

The coupling arrangement 10 may include an electromagnetic actuator which can be activated to help draw the male connectors 11*b*, 12*b* into the female connectors 11*a*, 12*b* to reduce the effort required by a user to establish the hydraulic connection.

In the embodiment shown in FIGS. 1 and 2, the two male connectors 11*b*, 12*b* are mounted on a support member in the form of plate 18 which carries a projection 19. The projection 19 extends parallel to, and offset from, the longitudinal axes of the male connectors 11*b*, 12*b*. An electromagnetic coil 20 is positioned between the female connectors 11*a*, 12*b* and has a longitudinal axis which is aligned parallel to longitudinal axes of the female connectors 11*a*, 12*a*.

The electromagnetic coil 20 may be mounted to the valve 13 or in some other location fixed relative to the female connectors 11*a*, 12*a*. The arrangement is configured such that with the male connectors 11*b*, 12*b* aligned ready to be inserted in the female connectors 11*a*, 12*b*, (that is to say, with the longitudinal axes of the male and female connectors of each coupling 11, 12 co-axial) the projection 19 is aligned for insertion in the electromagnetic coil 20 as shown in FIG. 1. At least the projection 19 of the support member 18 is made of a magnetically attractive material which may be a metallic material including a ferromagnetic metal. With the coupling arrangement positioned as shown in FIG. 1, actuation of the electromagnetic coil draws the projection 19 into the coil 20, moving the male connectors 11*b*, 12*b* towards and into the female connectors 11*a*, 12*a* in an axial direction parallel to the longitudinal axes of the connectors and helping to engage the male connectors 11*b*, 12*b* in their respective female connectors 11*a*, 12*b*. The electromagnetic attraction helps to overcome the resilient bias force of the locking arrangements of the couplings. Thus, the user does not have to manually overcome all of the bias force, which makes insertion easier. In embodiments, the male connectors 11*b*, 12*b* may be partially inserted in the female connectors 11*a*, 12*a* before the electromagnetic coil 20 is actuated to draw the male connectors 11*b*, 12*b* further into the female connectors 11*a*, 12*a* so as to fully engage the male and female connectors and establish a fluid connection between them.

Once the male connectors 11*b*, 12*b* have been inserted and the mechanical locking arrangements have engaged to hold the male connectors in the female connectors 11*b*, 12*b*, the electromagnetic coil 20 can be deactivated and the couplings are 11, 12 held together mechanically in the usual way.

Figure 6:
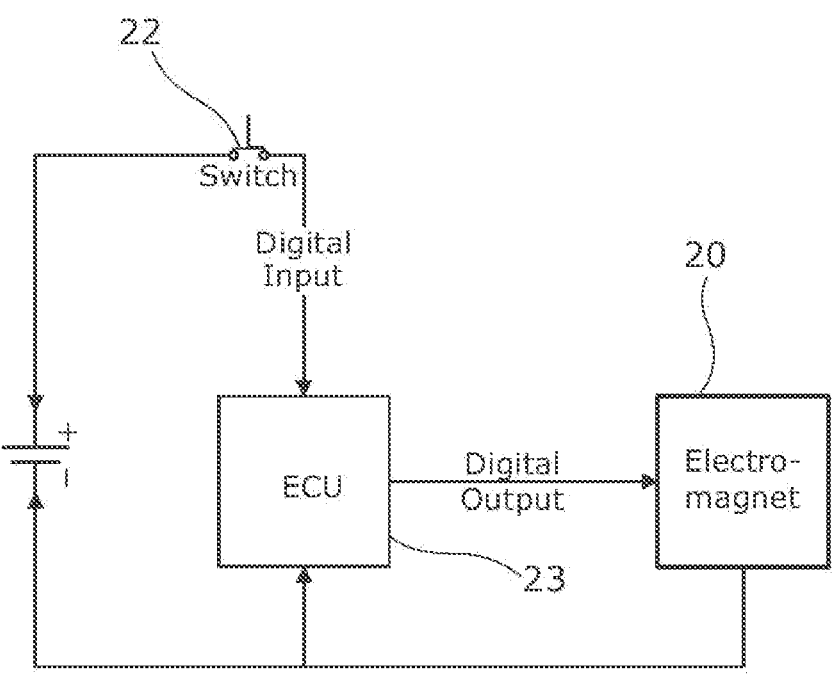
FIG. 6 shows a schematic diagram of an actuation circuit for an electromagnetic coil used in a hydraulic coupling arrangement.
Figure 7:
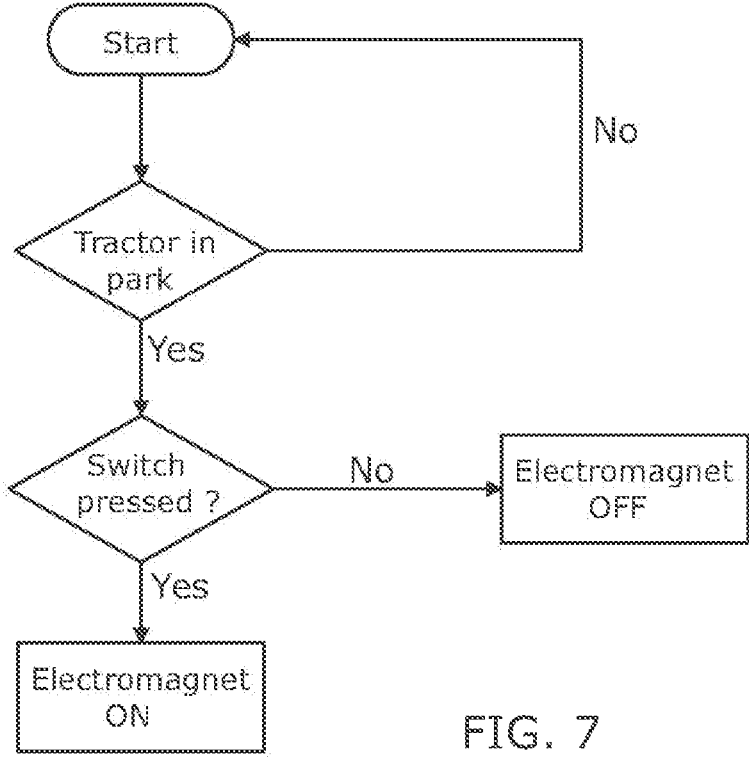
FIG. 7 illustrates an algorithm which may be used to control actuation of the electromagnetic coil of FIG. 6.

FIG. 6 shows a schematic diagram of an electrical circuit 21 for the activation of the electromagnetic coil 20 via a switch 22 and, optionally, an electronic control unit 23. When present, the electrical control unit 23 may operate a software algorithm shown diagrammatically in FIG. 7, which checks whether at least one condition is met before allowing the coil 20 to be activated. In an embodiment, the software algorithm checks whether the tractor 14 is in a parked condition before allowing the electromagnetic coil 20 to be activated. A parked condition may be confirmed if inputs to the electrical control unit 23 from various sensors or other control circuits of the vehicle 14 indicate that the tractor is in neutral and a parking brake applied for example.

Thus if the tractor 14 is parked and in a safe condition to connect the implement hydraulically to the vehicle, the ECU 23 permits the electromagnetic coil 20 to be activated when the switch 22 is pressed. The switch 22 can be conveniently located at the rear of the tractor adjacent the valve block 13 so as to be easily accessible by a user inserting the male connectors 11*b*, 12*b* into the female connectors 11*a*, 12*a*.

Figures 3, 4:
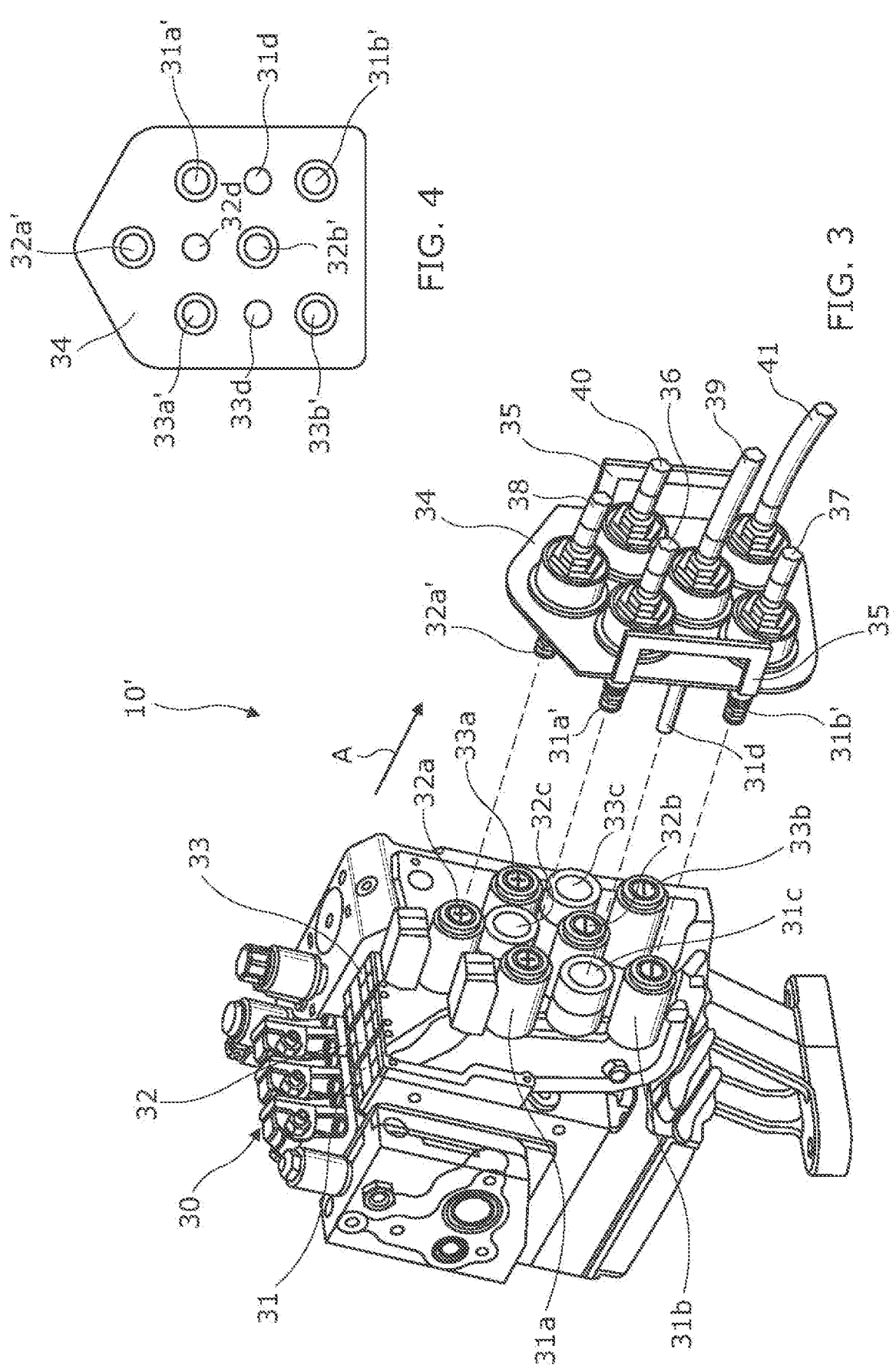
FIG. 3 shows a perspective view of a three-valve version of a coupling arrangement in a disconnected state.
FIG. 4 is a view in the direction of arrow A of FIG. 3 showing the layout of the male connectors and projections of the coupling arrangement of FIG. 3.

Typically each hydraulic coupling arrangement 10 comprises two quick-connect couplings 11, 12 which are part of a supply line and return line to a hydraulic consumer respectively. However, it is possible to have only a single coupling or that more than two couplings can be provided as part of a single hydraulic coupling arrangement. This latter arrangement is illustrated in FIGS. 3 and 4, which show a further embodiment of a coupling arrangement 10' accordance with the present disclosure.

In this exemplary embodiment, a valve block 30 consisting of three hydraulic valves 31 to 33 arranged side-by-side is provided. Each valve is associated with a pair of push-fit, quick-connect hydraulic couplings so that the coupling arrangement includes three female supply connectors 31*a*, 32*a* and 33*a* and three female return connectors 31*b*, 32*b* and 33*b* respectively with three electromagnetic coils 31*c*, 32*c* and 33*c*, each coil positioned between a respective pair of supply and return female connectors. These female connectors mate with corresponding male supply and return connectors 31*a'*, 31*b'*; 32*a'*, 32*b'* and 33*a'*, 33*b'* carried on a support plate 34 having handles 35. Each of the male connectors is connected to a respective associated hydraulic line 36, 37; 38, 39; 40, 41 forming part of a hydraulic circuit of an implement attached to the vehicle 14. The plate 34 also carries magnetically attractive projections 31*d*, 32*d* and 33*d* (see FIG. 4) which interact with coils 31*c*, 32*c* and 33*c* respectively.

Activation of the electromagnetic coils 31*c*, 32*c* and 33*c* is controlled via a single switch 22 through an electrical circuit similar to that shown in FIG. 6. Thus the switch 22 is closed and the coils are activated as the plate 34 is moved towards the valve block 30 so that the projections 31*d*, 32*d* and 33*d* are drawn into their respective coils 31*c*, 32*c* and 33*c* to assist in the insertion of the male connectors 31*a'*, 31*b'*; 32*a'*, 32*b'*; 33*a'*, 33*b'* into the female connectors 31*a*, 31*b*; 32*a*, 32*b*; 33*a*, 33*b*.

The switch 22 may be located at the rear of the tractor adjacent the valve block 30 so as to be easily accessible by a user inserting the male connectors into the female connectors.

Though an electromagnetic coil 31*c*, 32*c*, 33*c* and projection 31*d*, 32*d*, 33*d* are provided for each valve, and hence each pair of couplings, in the embodiment shown in FIGS. 3 and 4, it is possible that only two or even one electromagnetic coil and a corresponding number of projection(s) could be used, provided the arrangement can generate sufficient force to draw the male connectors into their respective female connectors when the coil or coils is/are activated.

The embodiment illustrated in FIGS. 3 and 4 enables supply and return couplings for a number of valves, in this case three valves 31, 32, 33, to be connected at the same time. However, in an alternative embodiment, the supply and return male connectors for at least one of the valves 31, 32, 33 can be provided on a separate support plate 34 with its own projection 31*d*, 32*d*, 33*d* so that the couplings for this valve can be connected and disconnected independently of the others. In this case, a single switch 22 may be used to control all of the electromagnetic coils 31*c*, 32*c*, 33*c* or each coil may be independently actuatable by a respective switch 22.

Though FIGS. 3 and 4 illustrate a valve block 30 with three valves 31, 32, 33, it will be appreciated that the general principles can be adapted for use with valve blocks having any number of valves, including valve blocks with 2, 3, 4, 5, 6, 7, and more valves. In this case, each valve may be provided with a separate coupling arrangement 10 or at least some of the valves in the valve block may have a combined coupling arrangement 10' similar to that shown in FIGS. 3 and 4.

It should also be appreciated that the connectors on the vehicle, which will usually be the female connectors 11*a*, 12*a*; 31*a*, 32*a*, 33*a*, need not be located on or immediately adjacent a respective valve. Rather, the (usually female) connectors 11*a*, 12*a*; 31*a*, 32*a*, 33*a*,33*b* could be located remotely from their respective valve 13; 31, 32, 33 and connected fluidly to respective ports of the valve. The fluid connection could be achieved in any suitable way, for example by fluid passages in hydraulic lines (flexible or rigid) or in a casting or other rigid component mounted to the valve, for example.

The present disclosure thus provides a hydraulic, quick-connect coupling arrangement in which the insertion of a male connector into a female connector is assisted by an electromagnetic actuator in an inexpensive and efficient manner. Though at least the projections 11*b*, 12*b*, 31*d*, 32*d*, 33*d* on the support plate 18, 34 are made of a magnetically attractive material, in some embodiments the plate 18, 34 itself may also be made of, or incorporate, or be coated with, a magnetically attractive material.

All references cited herein are incorporated herein in their entireties. If there is a conflict between definitions herein and in an incorporated reference, the definition herein shall control.

What is claimed is:

1. A hydraulic coupling arrangement comprising:
   at least one push-fit, quick-connect hydraulic coupling comprising a male connector and a female connector each defining a longitudinal axis, wherein the male connector is configured for insertion into the female connector in an axial direction parallel to the longitudinal axes of the connectors; and
   an electromagnetic actuator located externally of the connectors, wherein the electromagnetic actuator comprises an electromagnetic coil external to and associated with one connector, and a support member carrying the other connector, the support member comprising a magnetically attractive material for interaction with the coil, wherein the electromagnetic coil is operative to draw the magnetically attractive material, the support member, and the other connector in the axial direction to assist in the insertion of the male connector into the female connector, wherein the support member is coated with the magnetically attractive material, wherein the electromagnetic actuator is operative to draw the male connector into the female connector when the connectors are positioned for insertion of the male connector into the female connector.

2. A hydraulic coupling arrangement comprising:
   at least one push-fit, quick-connect hydraulic coupling comprising a male connector and a female connector each defining a longitudinal axis, wherein the male connector is configured for insertion into the female connector in an axial direction parallel to the longitudinal axes of the connectors; and
   an electromagnetic actuator located externally of the connectors, wherein the electromagnetic actuator is operative to draw the male connector into the female connector when the connectors are positioned for insertion of the male connector into the female connector, wherein the electromagnetic actuator comprising comprises:
      an electromagnetic coil external to and associated with one connector; and a support member carrying the other connector, the support member comprising a magnetically attractive material for interaction with the coil, wherein the electromagnetic coil is operative to draw the magnetically attractive material, the support member, and the other connector in the axial direction to assist in the insertion of the male connector into the female connector, wherein the magnetically attractive material comprises an elongate projection shaped for insertion into the electromagnetic coil, the projection having a longitudinal axis aligned parallel to the longitudinal axis of the other connector, the arrangement configured such that the projection is aligned for insertion in the electromagnetic coil when the connectors are positioned for insertion of the male connector into the female connector.

3. The hydraulic coupling arrangement of claim 2, wherein support member carries the male connector, the longitudinal axis of the projection being aligned parallel to and offset from the longitudinal axis of the male connector.

4. The hydraulic coupling arrangement of claim 2, further comprising at least two push-fit, quick-connect couplings, wherein the support member carries the other connector of each of the couplings, wherein the electromagnetic coil is operative to draw the magnetically attractive material, the support member, and the other connectors in the axial direction to assist in insertion of the male connectors into the female connectors.

5. The hydraulic coupling arrangement of claim 2, further comprising an actuator configured to activate the electromagnetic coil, in which the actuator comprises an electrical circuit including a manually operable switch for activating the coil.

6. The hydraulic coupling arrangement of claim 2, wherein the support member is coated with the magnetically attractive material.

7. The hydraulic coupling arrangement of claim 2, wherein the support member is made of the magnetically attractive material.

8. A combination of a utility vehicle and an implement attached to the utility vehicle, the combination comprising the hydraulic coupling arrangement of claim 2, wherein one connector forms part of a hydraulic supply system of the utility vehicle and the other connector forms part of a hydraulic circuit on the implement.

9. The combination of claim 8, wherein the hydraulic coupling arrangement comprises two push-fit, quick-connect hydraulic couplings, one coupling forming part of a supply line for supplying hydraulic fluid from the utility vehicle to a hydraulic consumer on the implement, the other coupling forming part of a return line for returning hydraulic fluid from the consumer on the implement to the utility vehicle, wherein the support member carries the other connector of each of the couplings, the arrangement configured such that with the connectors positioned for insertion of the male connectors into their respective female connectors, activation of the electromagnetic coil is operative to draw the magnetically attractive material, the support member, and the other connectors in the axial direction to assist in insertion of the male connectors into the female connectors.

10. The combination of claim 8, wherein one connector and the electromagnetic coil are mounted to the utility vehicle.

11. The combination of claim 10, wherein the support member is carried by the implement.

12. The combination of claim 10, further comprising an actuator configured to activate the electromagnetic coil, the actuator including an electrical circuit with a manually operable switch for activating the coil.

13. A method of using a coupling arrangement of claim 2, the method comprising:

with the connectors positioned for insertion of the male connector into the female connector, activating the electromagnetic coil to draw the magnetically attractive material, the support member, and the other connector in the axial direction to assist in the insertion of the male connector into the female connector; and deactivating the electromagnetic coil once the male connector is inserted into and coupled with the female connector.

14. A combination of a utility vehicle and an implement attached to the utility vehicle, the combination comprising:

a hydraulic coupling arrangement at least one push-fit, quick-connect hydraulic coupling comprising a male connector and a female connector each defining a longitudinal axis, wherein the male connector is configured for insertion into the female connector in an axial direction parallel to the longitudinal axes of the connectors; and an electromagnetic actuator located externally of the connectors, wherein the electromagnetic actuator is operative to draw the male connector into the female connector when the connectors are positioned for insertion of the male connector into the female connector, wherein the electromagnetic actuator comprising comprises:

an electromagnetic coil external to and associated with one connector; and a support member carrying the other connector, the support member comprising a magnetically attractive material for interaction with the coil, wherein the electromagnetic coil is operative to draw the magnetically attractive material, the support member, and the other connector in the axial direction to assist in the insertion of the male connector into the female connector;

an electrical circuit with a manually operable switch for activating the electromagnetic coil;

wherein one connector forms part of a hydraulic supply system of the utility vehicle and the one connector and the electromagnetic coil are mounted to the utility vehicle and the other connector forms part of a hydraulic circuit on the implement; and wherein the electrical circuit is configured to operate using an algorithm such that the electromagnetic coil can only be activated when at least one condition is met.

15. The combination of claim 14, wherein the at least one condition is indicative of the utility vehicle being in a park mode.

* * * * *